United States Patent [19]
Weder et al.

[11] Patent Number: 6,080,453
[45] Date of Patent: Jun. 27, 2000

[54] PREFORMED PLANT COVER HAVING AN ELASTIC FASTENER INCORPORATED THEREIN

[75] Inventors: Donald E. Weder; Joseph G. Straeter, both of Highland; William F. Straeter, Breese, all of Ill.

[73] Assignee: Southpac Trust International, Inc., Okla. City, Okla.; not individually, but as trustee of The Family Trust U/T/A dated Dec. 8, 1995, Charles A. Codding, Authorized Signatory for Southpac Trust International, Inc. trustee

[21] Appl. No.: 08/469,287

[22] Filed: Jun. 6, 1995

Related U.S. Application Data

[60] Division of application No. 08/364,356, Dec. 27, 1994, Pat. No. 5,551,140, which is a continuation-in-part of application No. 08/108,093, Aug. 17, 1993, Pat. No. 5,472,752, which is a continuation of application No. 08/024,573, Mar. 1, 1993, abandoned, which is a continuation of application No. 07/464,694, Jan. 16, 1990, Pat. No. 5,208,027, which is a continuation of application No. 07/219,083, Jul. 13, 1988, Pat. No. 4,897,031, which is a continuation of application No. 07/004,275, Jan. 5, 1987, Pat. No. 4,773,182, which is a continuation of application No. 06/613,080, May 22, 1984, abandoned, said application No. 08/364,356, is a continuation-in-part of application No. 08/188,183, Jan. 28, 1994, Pat. No. 5,388,386, which is a continuation of application No. 07/968,798, Oct. 30, 1992, Pat. No. 5,369,934, which is a continuation of application No. 07/865,563, Apr. 9, 1992, Pat. No. 5,245,814, which is a continuation of application No. 07/649,379, Jan. 31, 1991, Pat. No. 5,111,638, which is a continuation of application No. 07/249,761, Sep. 26, 1988, abandoned, said application No. 08/364,356, is a continuation-in-part of application No. 07/934,832, Aug. 24, 1992, Pat. No. 5,426,914, which is a continuation-in-part of application No. 07/819,311, Jan. 9, 1992, abandoned, which is a continuation of application No. 07/765,416, Sep. 26, 1991, Pat. No. 5,105,599, which is a continuation of application No. 07/530,491, May 29, 1990, abandoned, which is a continuation of application No. 07/315,169, Feb. 24, 1989, abandoned, said application No. 07/934,832, is a continuation-in-part of application No. 07/832,096, Feb. 6, 1992, abandoned, which is a continuation-in-part of application No. 07/765,416, Sep. 26, 1991, Pat. No. 5,105,599, which is a continuation of application No. 07/530,491, May 29, 1990, abandoned, which is a continuation of application No. 07/315,169, Feb. 24, 1989, abandoned.

[51] Int. Cl.[7] ........................................................ B32B 9/00
[52] U.S. Cl. .............................. 428/14; 428/5; 428/13; 428/17; 428/18; 428/26; 428/34.2; 428/48; 428/99; 428/127; 53/399; 53/464; 53/580; 47/72
[58] Field of Search ................................... 428/5, 12, 13, 428/14, 17, 18, 26, 22, 76, 34.2, 34.7, 48, 35.8, 58, 64, 99, 102, 127, 136; 47/72, 66; 53/393, 464, 580

[56] References Cited

U.S. PATENT DOCUMENTS 1,102,499   7/1914   Haist .

(List continued on next page.)

FOREIGN PATENT DOCUMENTS 560532   4/1972   Switzerland .

OTHER PUBLICATIONS

"The Simple Solution For Those Peak Volume Periods", Highland Supply Speed Cover® Brochure, 1989©, 6 pages.

(List continued on next page.)

*Primary Examiner*—Patrick Ryan
*Assistant Examiner*—Abraham Bahta
*Attorney, Agent, or Firm*—Dunlap & Codding, P.C.

[57] ABSTRACT

A cover for a flower pot, the cover comprising a sheet of material sized to substantially surround and encompass the outer peripheral surface of the flower pot and a fastener comprised of elastic or elasticized materials and forming a generally continuous loop, the fastener connectingly held to either the upper surface or the lower surface of the sheet of material. The fastener can be stretched to an extent sufficient to enable the fastener to be disposed about the outer peripheral surface of the flower pot and to hold the sheet of material applied thereabout. The invention further comprises a method for wrapping a pot with a covering such as described above, and a preformed pot cover having a fastener connected circumferentially to the interior surface of the pot cover.

20 Claims, 10 Drawing Sheets

U.S. PATENT DOCUMENTS

| | | |
|---|---|---|
| 1,446,563 | 2/1923 | Hughes . |
| 1,610,652 | 12/1926 | Bouchard . |
| 1,868,853 | 7/1932 | Sievers . |
| 1,994,962 | 3/1935 | Rushfeldt . |
| 2,152,648 | 4/1939 | Jones . |
| 2,209,778 | 7/1940 | Krasowski . |
| 2,236,936 | 4/1941 | Camp ......................................... 100/31 |
| 2,239,398 | 4/1941 | Palmer ....................................... 229/14 |
| 2,302,259 | 11/1942 | Rothfuss . |
| 2,355,559 | 8/1944 | Renner ......................................... 229/8 |
| 2,367,168 | 1/1945 | Cheesman ................................. 100/31 |
| 2,514,038 | 7/1950 | Doolittle ................................. 226/129 |
| 2,781,811 | 2/1957 | Dilar et al. ............................... 150/52 |
| 2,924,926 | 2/1960 | Paine et al. .............................. 53/135 |
| 3,052,063 | 9/1962 | Dunn . |
| 3,094,810 | 6/1963 | Kalpin . |
| 3,316,675 | 5/1967 | Cartwright, Jr. . |
| 3,360,901 | 1/1968 | Gallo ......................................... 53/390 |
| 3,362,105 | 1/1968 | Steiger . |
| 3,376,666 | 4/1968 | Leonard . |
| 3,488,022 | 1/1970 | Vittori ..................................... 248/152 |
| 3,531,910 | 10/1970 | Snead ......................................... 53/135 |
| 3,909,979 | 10/1975 | Perez . |
| 3,962,503 | 6/1976 | Crawford .................................. 428/40 |
| 3,974,762 | 8/1976 | Kita et al. ................................... 100/9 |
| 4,300,312 | 11/1981 | Weder et al. ............................... 47/72 |
| 4,333,267 | 6/1982 | Witte .......................................... 47/84 |
| 4,379,101 | 4/1983 | Smith ..................................... 264/40.3 |
| 4,570,415 | 2/1986 | Centeno ................................... 53/399 |
| 4,646,470 | 3/1987 | Maggio ...................................... 47/76 |
| 4,733,521 | 3/1988 | Weder et al. ............................. 53/580 |
| 4,768,276 | 9/1988 | Harlow ..................................... 29/432 |
| 4,773,182 | 9/1988 | Weder et al. ............................... 47/72 |
| 4,799,520 | 1/1989 | Blackburn ............................... 150/52 |
| 4,835,834 | 6/1989 | Weder ..................................... 29/525 |
| 4,980,209 | 12/1990 | Hill ....................................... 428/34.1 |
| 5,077,937 | 1/1992 | Weder et al. ............................... 47/72 |
| 5,105,599 | 4/1992 | Weder ..................................... 53/399 |

OTHER PUBLICATIONS

Klerks Plastic Products Manufacturing, Inc. —A World of Cut Flower and Pot Plant Packaging.

"Speed Sheets® And Speed Rolls", Highland Supply Speed Sheets® Brochure, 1990©, 2 pages.

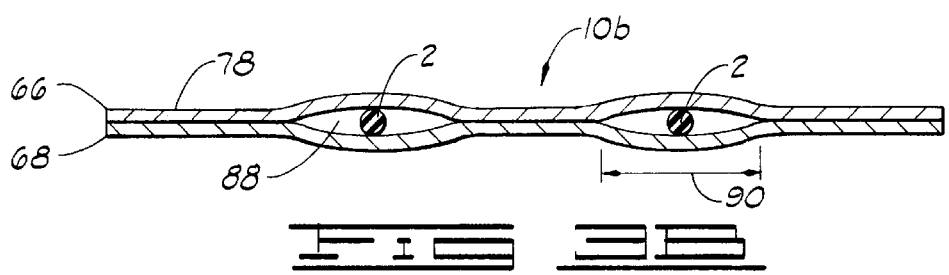
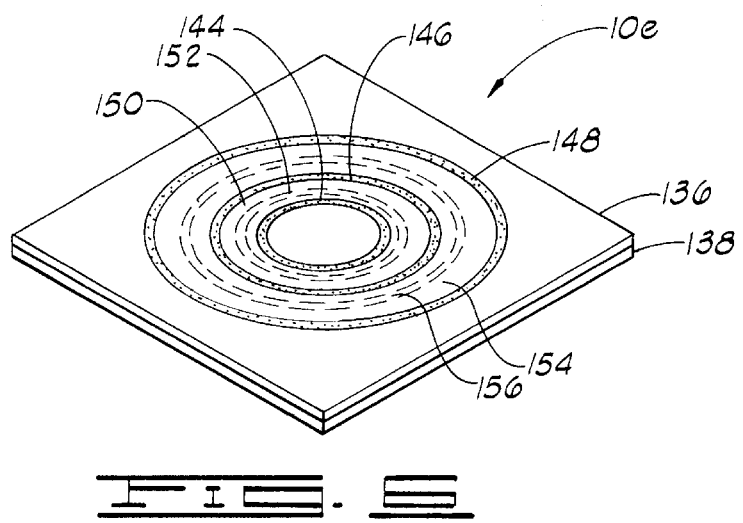
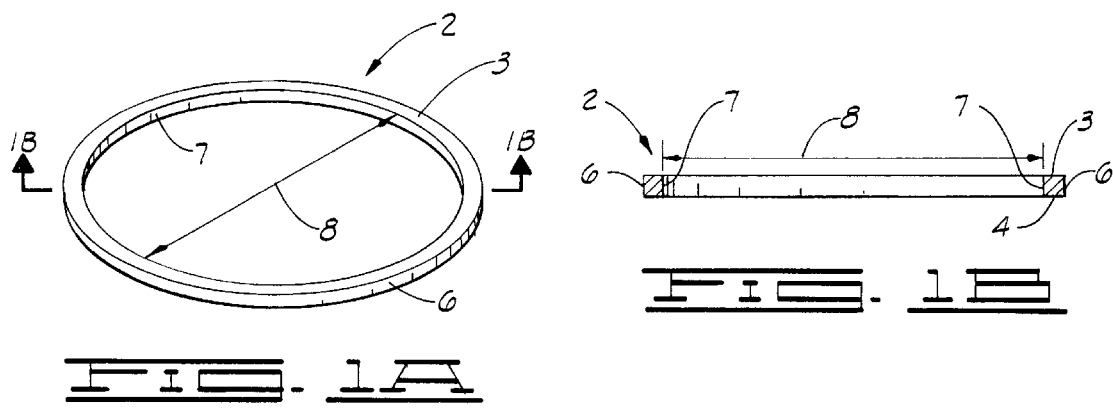

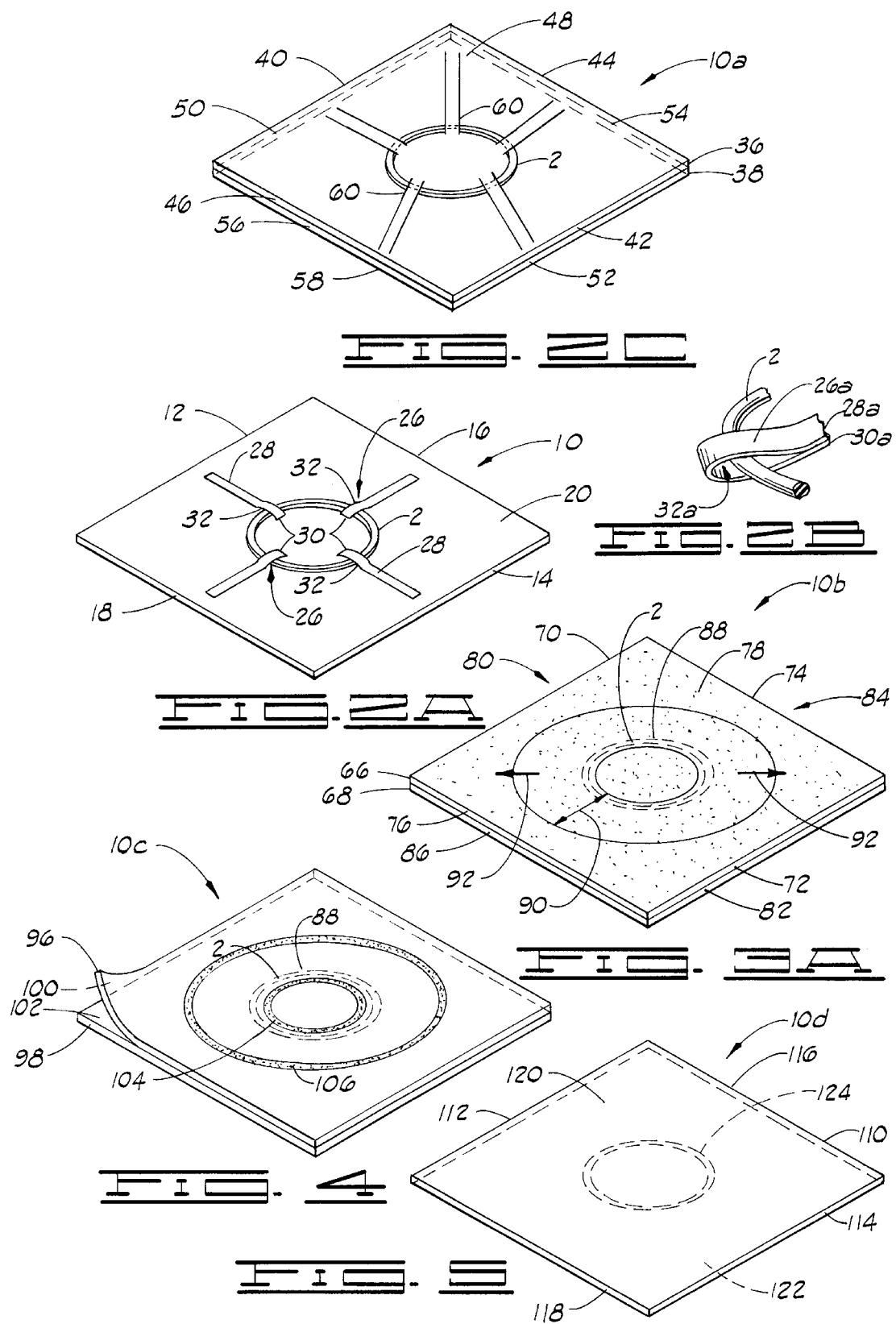

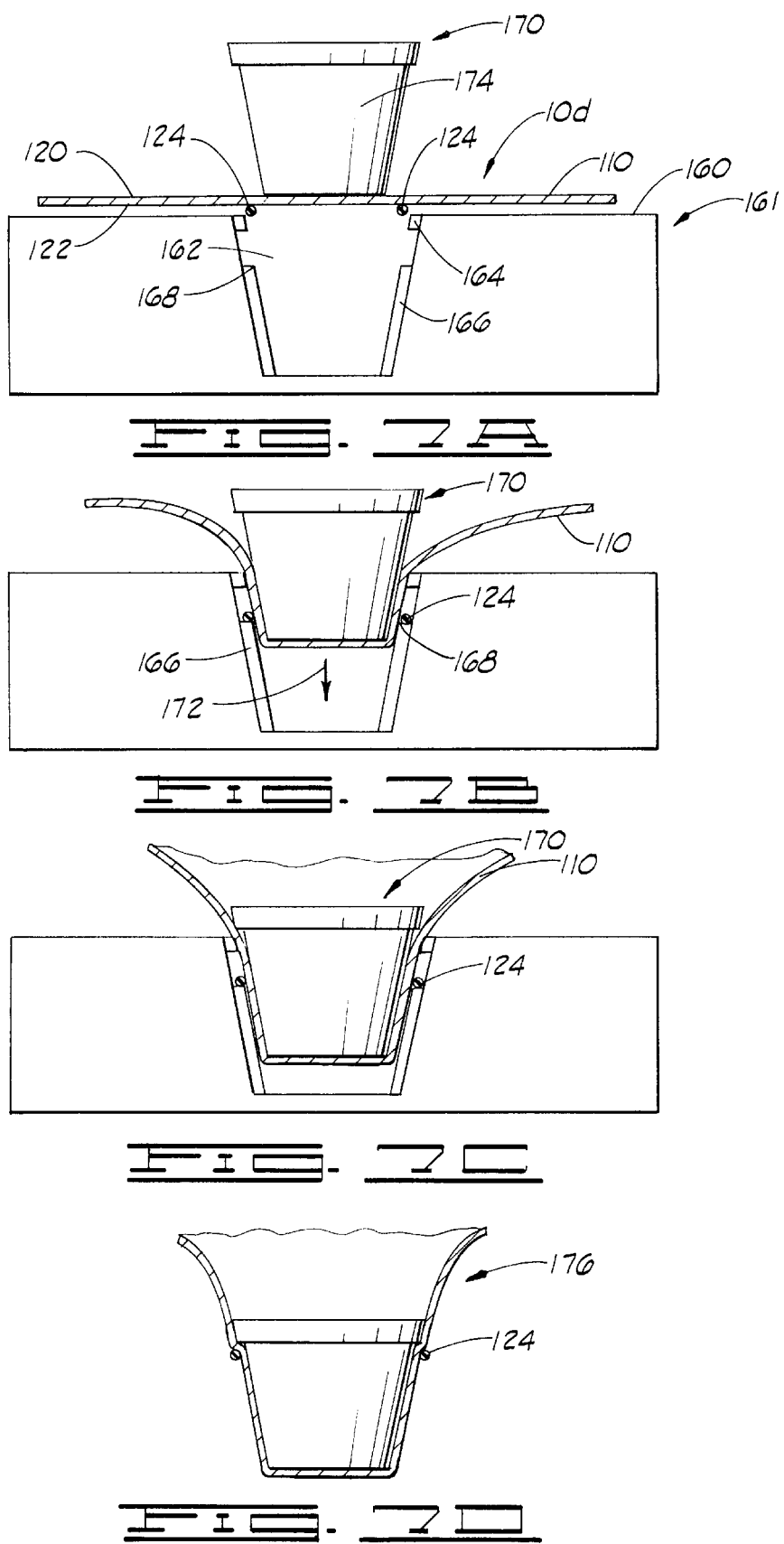

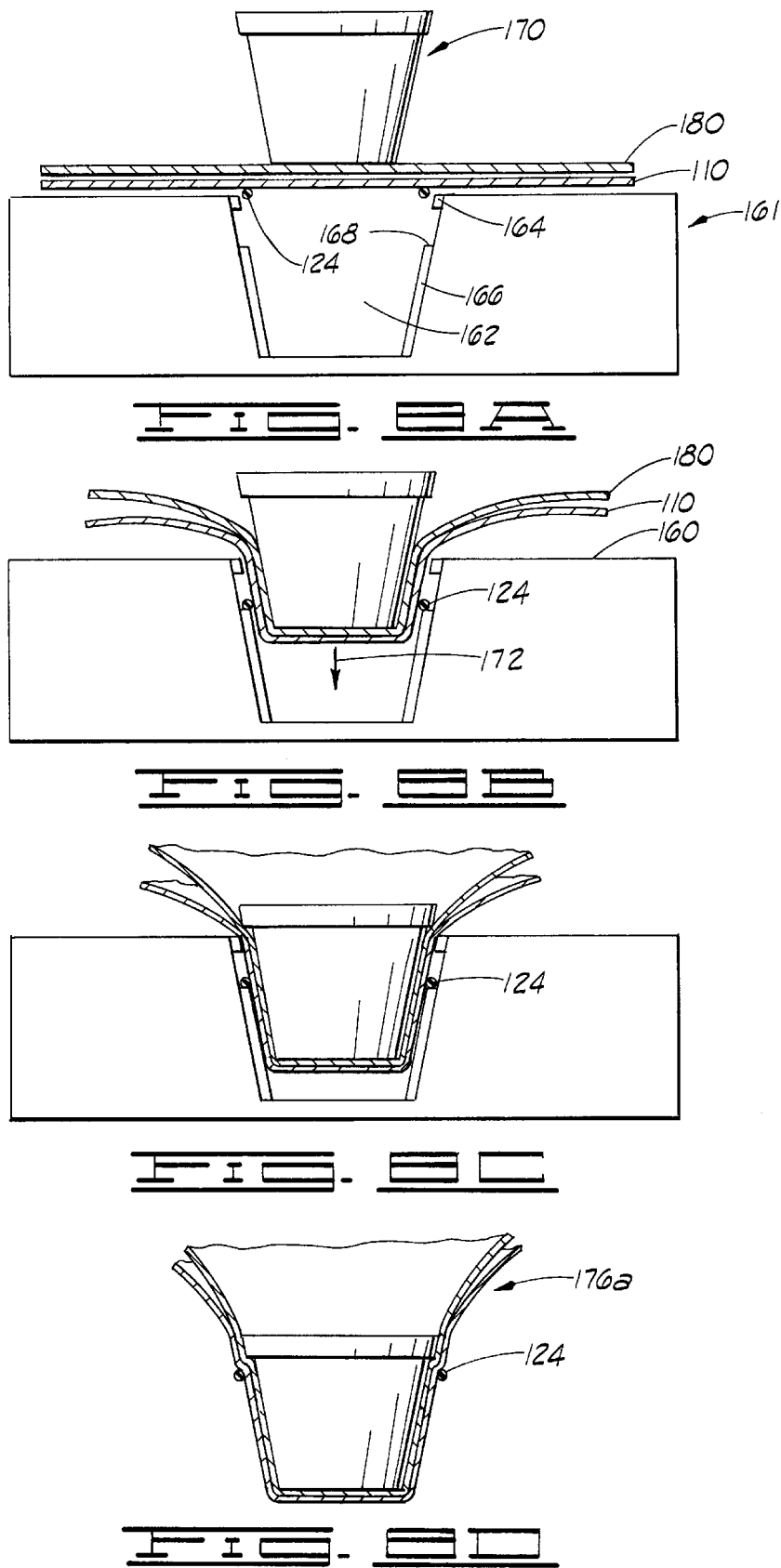

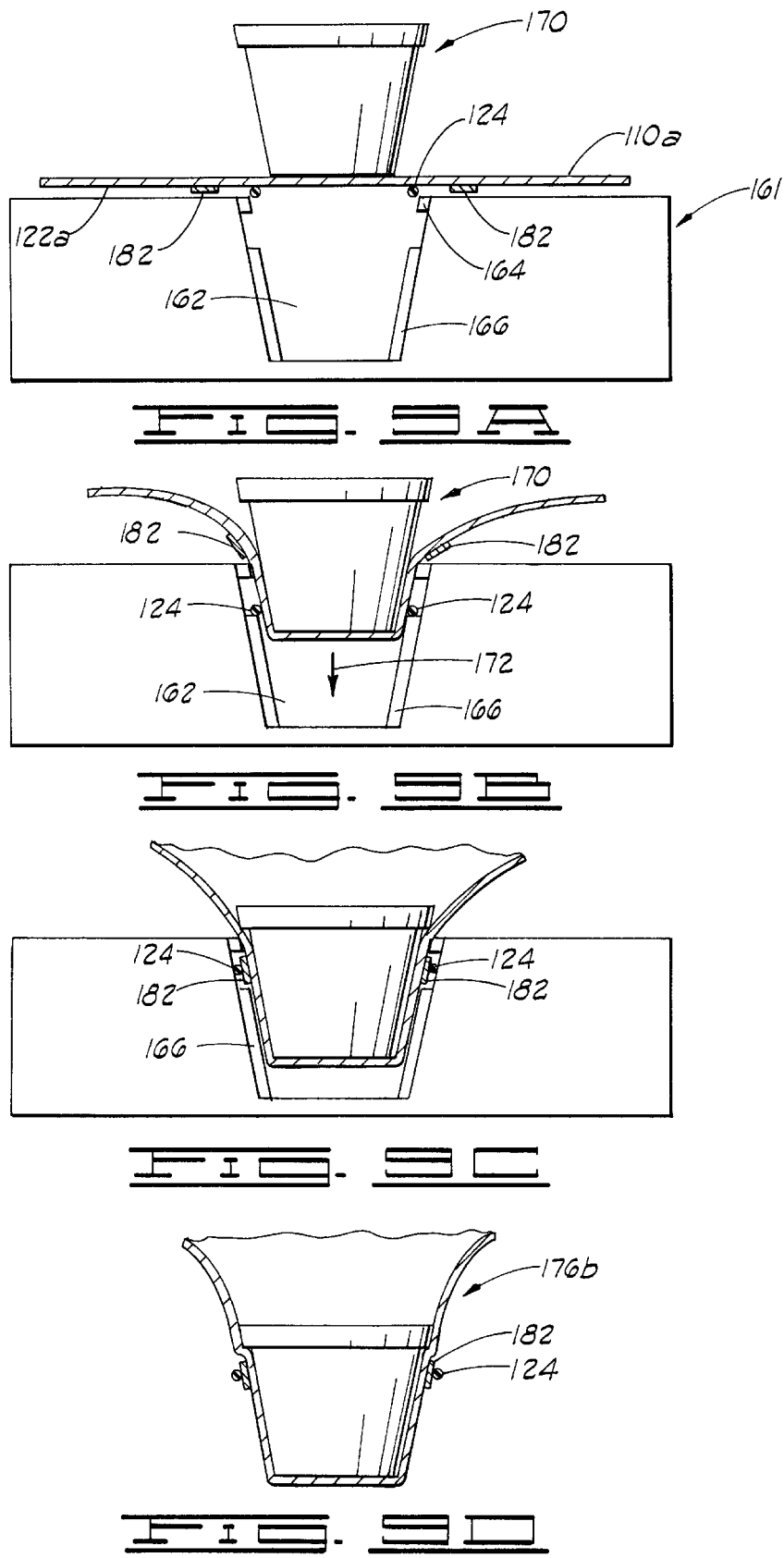

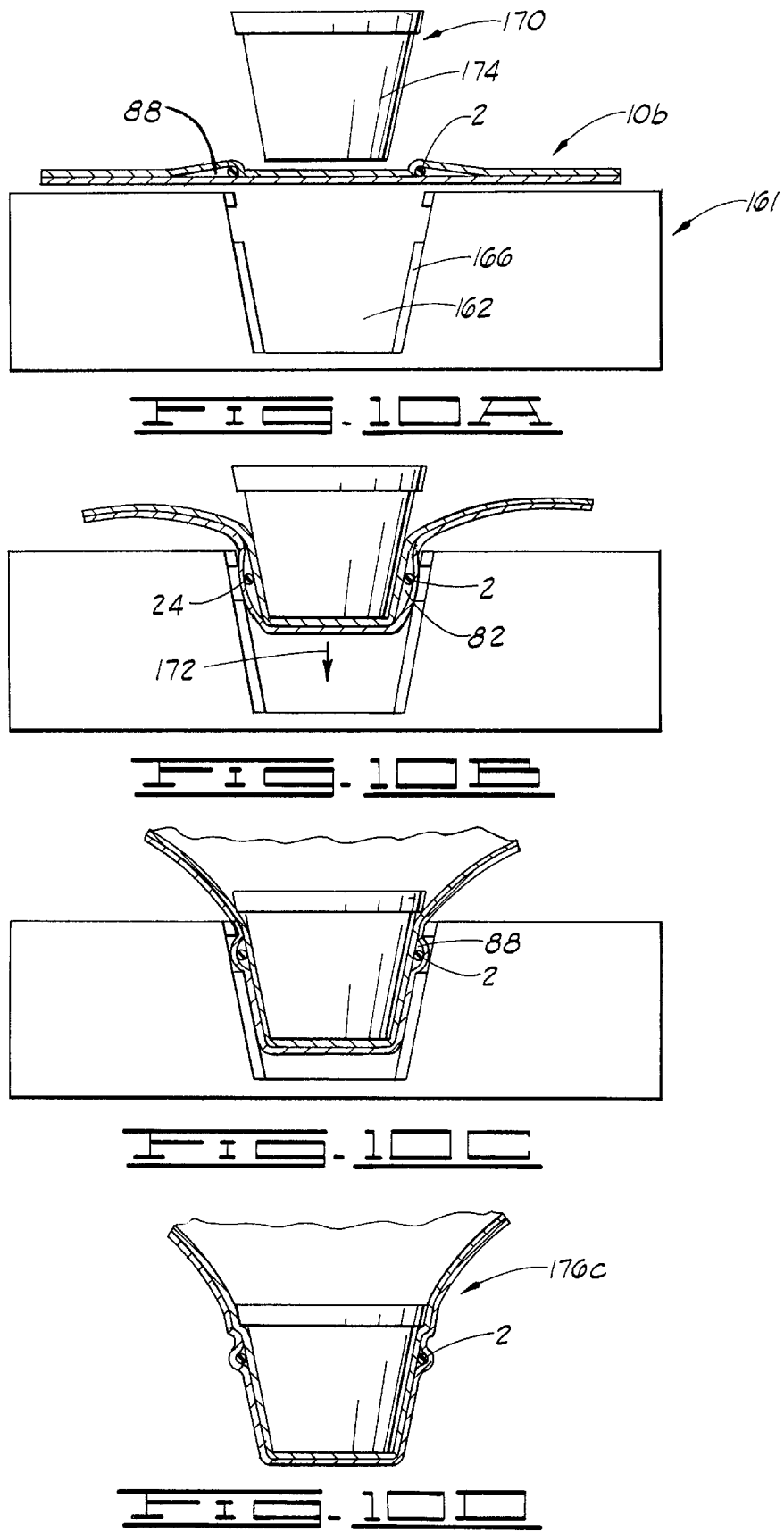

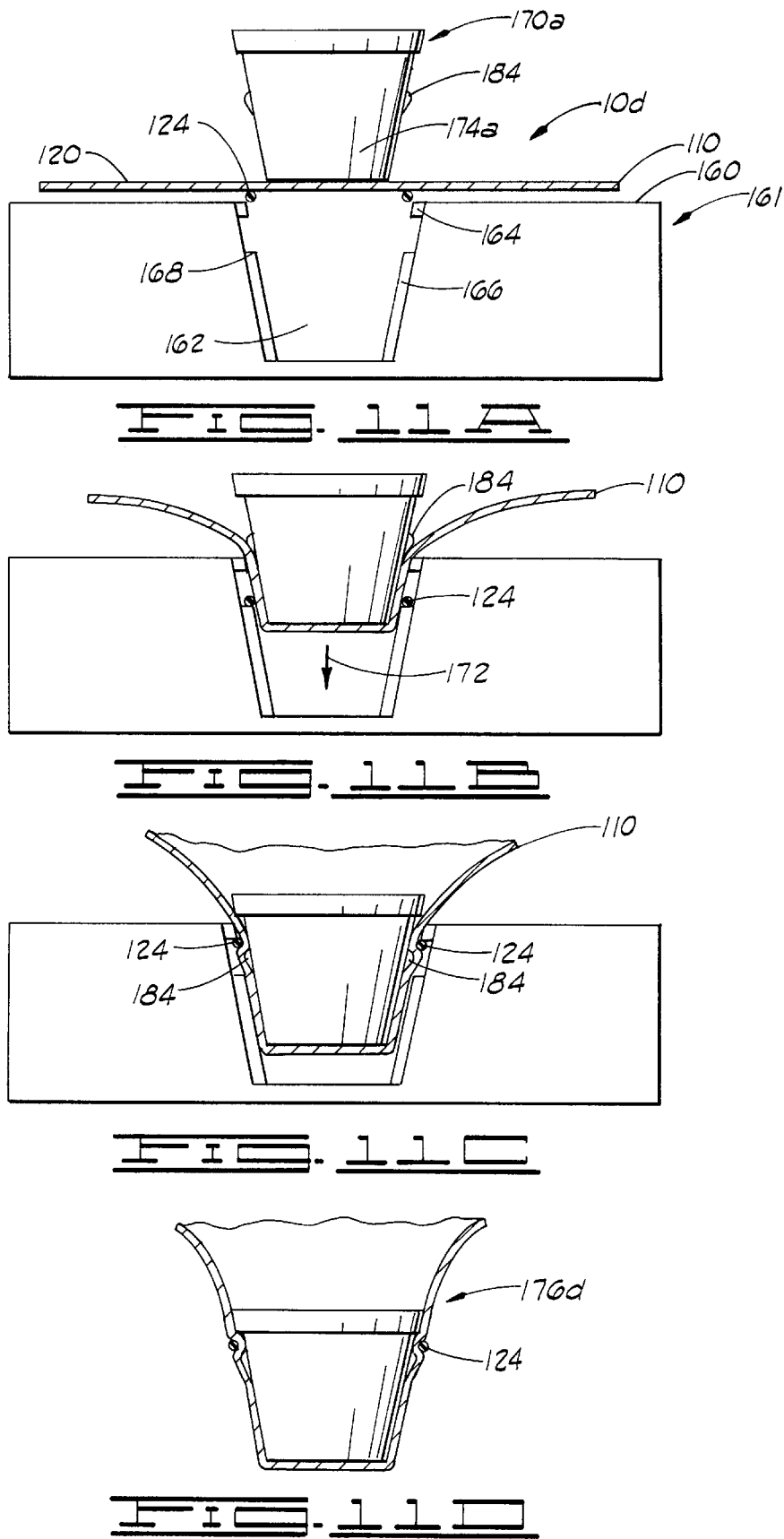

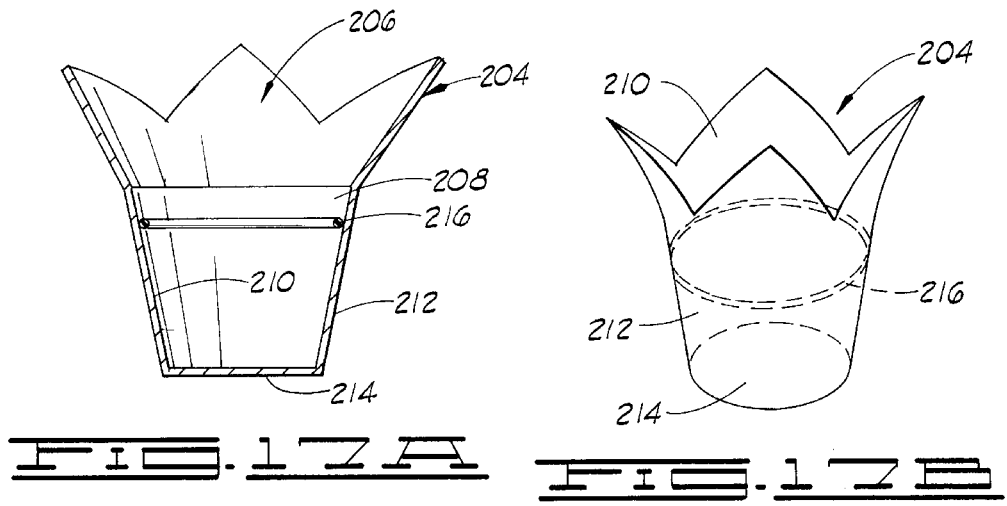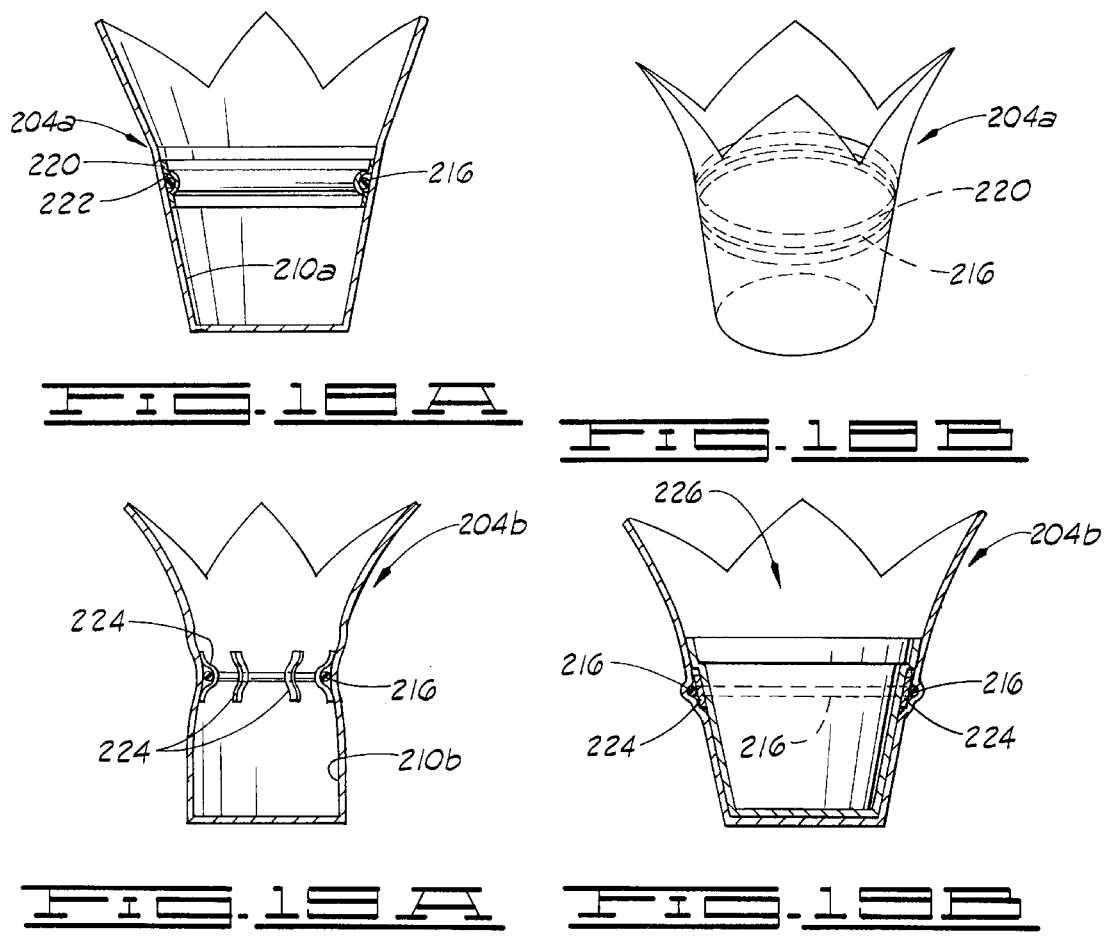

ated May 29, 1990, entitled MEANS FOR SECURING A DECORATIVE COVER ABOUT A FLOWER POT, now
PREFORMED PLANT COVER HAVING AN ELASTIC FASTENER INCORPORATED THEREIN

CROSS-RELATED REFERENCES

This application is a divisional of U.S. Ser. No. 08/364,356, filed Dec. 27, 1994, now U.S. Pat. No. 5,551,140 which is a continuation-in-part of U.S. Ser. No. 08/108,093, filed Aug. 17, 1993, entitled ARTICLE FORMING SYSTEM, now U.S. Pat. No. 5,472,752; which is a continuation of U.S. Ser. No. 08/024,573, filed Mar. 1, 1993, entitled ARTICLE FORMING SYSTEM now abandoned; which is a continuation of U.S. Ser. No. 07/464,694, filed Jan. 16, 1990, entitled ARTICLE FORMING SYSTEM, now U.S. Pat. No. 5,208,027, issued on May 4, 1993; which is a continuation of U.S. Ser. No. 07/219,083, filed Jul. 13, 1988, entitled ARTICLE FORMING SYSTEM, now U.S. Pat. No. 4,897,031, issued on Jan. 30, 1990; which is a continuation of U.S. Ser. No. 07/004,275, filed Jan. 5, 1987, entitled ARTICLE FORMING SYSTEM, now U.S. Pat. No. 4,773,182, issued on Sep. 27, 1988; which is a continuation of 06/613,080, filed May 22, 1984, entitled ARTICLE FORMING SYSTEM, now ABANDONED.

Said U.S. Ser. No. 08/364,356, now U.S. Pat. No. 5,551,140, is also a continuation-in-part of U.S. Ser. No. 08/188,183, filed Jan. 28, 1994, entitled METHOD FOR WRAPPING AN OBJECT WITH AN EMBOSSED MATERIAL HAVING AN ADHESIVE THEREON now U.S. Pat. No. 5,388,386; which is a continuation of U.S. Ser. No. 07/968,798, filed Oct. 30, 1992, entitled METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL, now U.S. Pat. No. 5,369,934, issued on Dec. 6, 1994; which is a continuation of U.S. Ser. No. 07/865,563, filed Apr. 9, 1992, entitled METHODS FOR WRAPPING A FLORAL GROUPING, now U.S. Pat. No. 5,245,814, issued on Sep. 21, 1993; which is a continuation of U.S. Ser. No. 07/649,379, filed Jan. 31, 1991, entitled METHOD FOR WRAPPING AN OBJECT WITH A MATERIAL HAVING PRESSURE SENSITIVE ADHESIVE THEREON, now U.S. Pat. No. 5,111,638, issued on May 12, 1992; which is a continuation of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now ABANDONED.

Said U.S. Ser. No. 08/364,356 is also a continuation-in-part of U.S. Ser. No. 07/934,832, filed Aug. 24, 1992 now U.S. Pat. No. 5,426,914, entitled BAND APPLICATOR FOR APPLYING A BAND ABOUT A SHEET OF MATERIAL AND A POT; which is a continuation-in-part of U.S. Ser. No. 07/819,311, filed Jan. 9, 1992, entitled MEANS FOR SECURING A DECORATIVE COVER ABOUT A FLOWER POT, now ABANDONED; which is a continuation of U.S. Ser. No. 07/765,416, filed Sep. 26, 1991, entitled MEANS FOR SECURING A DECORATIVE COVER ABOUT A FLOWER POT, now U.S. Pat. No. 5,105,599, issued on Apr. 21, 1992; which is a continuation of U.S. Ser. No. 07/530,491, filed May 29, 1990, entitled MEANS FOR SECURING A DECORATIVE COVER ABOUT A FLOWER POT, now ABANDONED; which is a continuation of U.S. Ser. No. 07/315,169, filed Feb. 24, 1989, entitled MEANS FOR SECURING A DECORATIVE COVER ABOUT A FLOWER POT, now ABANDONED.

Said application 07/934,832, now U.S. Pat. No. 5,426,914, is also a continuation-in-part of U.S. Ser. No. 07/832,096, filed Feb. 6, 1992, entitled MEANS FOR SECURING A DECORATIVE COVER ABOUT A FLOWER POT, now ABANDONED; which is a continuation-in part of U.S. Ser. No. 07/765,416, filed Sep. 26, 1991, entitled MEANS FOR SECURING A DECORATIVE COVER ABOUT A FLOWER POT, now U.S. Pat. No. 5,105,599, issued Apr. 21, 1992; which is a continuation of U.S. Ser. No. 07/530,491. filed May 29, 1990, entitled MEANS FOR SECURING A DECORATIVE COVER ABOUT A FLOWER POT, now ABANDONED; which is a continuation of U.S. Ser. No. 07/315,169, filed Feb. 24, 1989, entitled MEANS FOR SECURING A DECORATIVE COVER ABOUT A FLOWER POT, now ABANDONED.

FIELD OF THE INVENTION

The present invention relates generally to sheets of material and more particularly, but not by way of limitation, to preformed pot covers which have connected to a surface thereof an elastic or elasticized fastener which when applied about the outer peripheral surface of a potted plant or pot enables the self-adherence of the sheet or cover to the potted plant or pot.

BRIEF DESCRIPTION OF THE DRAWINGS

FIG. 1A is a perspective view of a fastener used in accordance with the present invention.

FIG. 1B is a side view of the fastener shown in FIG. 1A.

FIG. 2A is a perspective view of a sheet of material constructed in accordance with the present invention.

FIG. 2B is a perspective view of another version of a loop used in accordance with the present invention.

FIG. 2C is a perspective view of another sheet of material constructed in accordance with the present invention.

FIG. 3A is a perspective view of yet another sheet of material constructed in accordance with the present invention.

FIG. 3B is a cross-sectional view of the sheet of material of FIG. 3A.

FIG. 4 is a perspective view of another sheet of material constructed in accordance with the present invention.

FIG. 5 is a perspective view of yet another sheet of material constructed in accordance with the present invention.

FIG. 6 is a perspective view of still another sheet of material constructed in accordance with the present invention.

FIG. 7A is a side-sectional view of the sheet of material of FIG. 5 used in accordance with the present invention.

FIG. 7B is a side-sectional view of the sheet of material of FIG. 5 after it has been partially formed about a pot.

FIG. 7C is a side-sectional view of the sheet of material of FIG. 5 after the fastener is nearly in its final position.

FIG. 7D is a side-sectional view of the sheet of material of FIG. 5 after the sheet is fastened to the pot and after the covered pot is removed from the cover forming apparatus.

FIG. 8A is a side-sectional view of the sheet of material of FIG. 5 used in accordance with the present invention.

FIG. 8B is a side-sectional view of the sheet of material of FIG. 5 after it has been partially formed about a pot.

FIG. 8C is a side-sectional view of the sheet of material of FIG. 5 after the fastener is nearly in its final position.

FIG. 8D is a side-sectional view of the sheet of material of FIG. 5 after the sheet is fastened to the pot and after the covered pot is removed from the cover forming apparatus.

FIG. 9A is a side-sectional view of the sheet of material of FIG. 5 used in accordance with the present invention.

FIG. 9B is a side-sectional view of the sheet of material of FIG. 5 after it has been partially formed about a pot.

FIG. 9C is a side-sectional view of the sheet of material of FIG. 5 after the fastener is nearly in its final position.

FIG. 9D is a side-sectional view of the sheet of material of FIG. 5 after the sheet is fastened to the pot and after the covered pot is removed from the cover forming apparatus.

FIG. 10A is a side-sectional view of the sheet of material of FIG. 5 used in accordance with the present invention.

FIG. 10B is a side-sectional view of the sheet of material of FIG. 5 after it has been partially formed about a pot.

FIG. 10C is a side-sectional view of the sheet of material of FIG. 5 after the fastener is nearly in its final position.

FIG. 10D is a side-sectional view of the sheet of material of FIG. 5 after the sheet is fastened to the pot and after the covered pot is removed from the cover forming apparatus.

FIG. 11A is a side-sectional view of the sheet of material of FIG. 5 used in accordance with the present invention.

FIG. 11B is a side-sectional view of the sheet of material of FIG. 5 after it has been partially formed about a pot.

FIG. 11C is a side-sectional view of the sheet of material of FIG. 5 after the fastener is nearly in its final position.

FIG. 11D is a side-sectional view of the sheet of material of FIG. 5 after the sheet is fastened to the pot and after the covered pot is removed from the cover forming apparatus.

FIG. 17A is a cross-sectional view of a preformed pot cover having a fastener secured to the interior surface of the cover.

FIG. 17B is a perspective view of the preformed pot cover of FIG. 17A.

FIG. 18A is a cross-sectional view of another preformed pot cover having a fastener secured thereto.

FIG. 18B is a perspective view of the preformed pot cover of FIG. 18A.

FIG. 19A is a cross-sectional view of yet another preformed pot cover having a fastener secured thereto.

FIG. 19B is a view of the pot cover of FIG. 19A with a pot positioned therein.

DETAILED DESCRIPTION

Figure 12:
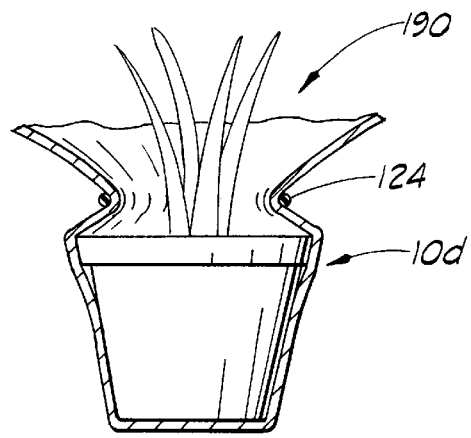
FIG. 12 is a side-sectional view of a pot cover constructed in accordance with the present invention having the fastener positioned above the upper rim of the pot.

The present invention contemplates a sheet of material or a preformed plant cover which has connected thereto an elastic or elasticized fastener which when applied to a potted plant or pot enables the self-adherence of the sheet or cover to the potted plant or pot.

More particularly, the present invention contemplates a covering material for covering a flower pot having an outer peripheral surface and an upper opening, wherein the covering material comprises (1) a sheet of material having an upper surface, a lower surface, a first end, a second end, a first side and a second side, the sheet of material sufficiently sized to substantially surround and encompass the outer peripheral surface of the flower pot when formed thereabout and (2) a fastener comprising elastic or elasticized materials and forming a generally continuous loop, the fastener having an upper side and a lower side, and wherein one of the upper side or the lower side of the fastener is connectingly held to either the upper surface or the lower surface of the sheet of material such that the fastener is at least initially connected to the sheet of material yet can be stretched to an extent sufficient to enable the fastener to be disposed about the outer peripheral surface of the flower pot and the sheet of material applied thereabout, the sheet of material held about the outer peripheral surface of the flower pot when the fastener is stretched in such a manner.

The present invention also contemplates a method of forming a flower pot cover from the covering material described above, comprising the steps of (1) providing a cover forming means comprising a platform having an upper support surface and an opening formed in the upper support surface for receiving a flower pot, (2) providing a flower pot having an outer peripheral surface and an upper opening, (3) providing a covering material for covering the flower pot, wherein the covering material further comprises a sheet of material and an elastic or elasticized fastener connected to the sheet of material, (4) disposing the covering material upon the upper support surface of the platform of the cover forming means and over the flower pot opening wherein the fastener is disposed in a position over the flower pot opening, (5) placing the flower pot over the flower pot opening, (6) moving the flower pot into engagement with the covering material and through the flower pot opening in the cover forming means for forming the covering material about the outer peripheral surface of the flower pot while leaving the upper opening of the flower pot at least partially uncovered and simultaneously holding the covering material in place disposed about the outer peripheral surface of the flower pot wherein the fastener connected to the sheet of material of the covering material is stretched about the outer peripheral surface of the flower pot holding the sheet of material in a position about the outer peripheral surface of the flower pot while the cover forming means holds the sheet of material wrapped in place about the flower pot and while leaving the upper opening of the flower pot at least partially uncovered providing a decorative covering for the flower pot, and (7) removing the flower pot with the sheet of material held by the fastener thereto from the flower pot opening in the cover forming means.

The invention further contemplates a preformed cover for covering a flower pot, the preformed cover comprising (1) a preformed sheet of material formed into a shape sized to receive a flower pot, the preformed sheet of material having a base having a closed lower end and an open upper end with an object opening extending therethrough for receiving the flower pot, and an interior surface extending from the opening to the closed lower end, and (2) a fastener comprised of elastic or elasticized materials and connected circumferentially to the interior surface of the preformed sheet of material.

More particularly, the invention contemplates a preformed cover comprising (1) a preformed sheet of material formed into a shape sized to receive a flower pot, the preformed sheet of material having a base having a closed lower end and an open upper end with an object opening extending therethrough for receiving the flower pot, and an interior surface extending from the opening to the closed lower end, wherein the preformed sheet of material is flexible and wherein the forming of the sheet of material into the preformed sheet of material is accomplished by substantially permanently fixing a portion of the sheet into a plurality of overlapping folds to form the base of the preformed sheet of material and for cooperating to retain the preformed sheet of material in the formed shape, and (2) a fastener comprised of elastic or elasticized materials and forming a generally continuous loop, the fastener connected circumferentially to the interior surface of the preformed sheet of material and the fastener sufficiently elastic to allow insertion of the flower pot into the object opening of the preformed sheet of material when the fastener is stretched and, once the flower pot has been deposited into the object opening of the preformed sheet of material, the fastener tending to return to its original shape causing the interior surface of the preformed pot cover to be held to the outer peripheral surface of the flower pot.

The Embodiments of FIGS. 1–6

Shown in FIGS. 1A and 1B is an elastic or elasticized fastener designated by the reference numeral 2. The fastener 2 is generally in the form of a loop or ring and is preferably continuous. The fastener has a first side 3 and a second side 4, an outer peripheral surface 6 and an inner surface 7 and an internal diameter 8. In cross-section, the fastener 2 may be rectangular, as shown in FIGS. 1A and 1B, or it may be circular in cross-section.

Shown in FIG. 2A and designated therein by the general reference numeral 10 is a sheet of material. The sheet of material 10 has a first end 12, a second end 14, a first side 16, a second side 18, an upper surface 20 and a lower surface (not visible).

A closure bonding material may be disposed on the upper surface 20 of the sheet of material, alternatively, the sheet of material 10 may be free of a closure bonding material. The closure bonding material if present may be disposed on the upper surface 20 in a strip of closure bonding material, although the closure bonding material also could be applied to the upper surface 20 of the sheet of material 10 in the form of spaced apart spots or the closure bonding material also could be disposed on the upper surface 20 of the sheet of material 10 in any other geometric form and in any pattern including covering the entire upper surface 20 of the sheet of material 10. The term "spot" or "spots" includes any geometric shape of spot including, but not limited to, what is commonly referred to as strips.

The sheet of material 10 has a thickness in a range from about 0.1 mils to about 30 mils. Preferably, the sheet of material 10 has a thickness in a range from about 0.1 mils to about 5 mils.

The sheet of material 10 may be any shape and a square or rectangular shape is shown in FIG. 2A only by way of example. The sheet of material 10 for example only may be square, rectangular, circular or any other geometric shape such as heart shaped, for example only.

Secured to the upper surface 20 of the sheet of material 10 is the elastic or elasticized fastener 2. The fastener 2 is secured to the upper surface 20 by a plurality of loops 26. Each loop 26 has a first end 28 attached to the upper surface 20 and a second end 30 attached to the upper surface 20. Between each first end 28 and each second end 30 is an intervening portion 32 which is unconnected to the upper surface 20 and thus allows a partially unrestricted movement of the fastener 2 disposed under the loops 26.

Shown in FIG. 2B and designated by the reference numeral 26a is another version of how the loop may be configured in the present invention. A first loop end 28a and a second loop end 30a are connected together to a position on the sheet of material 10 thus leaving an intervening portion 32a for holding the fastener 2 in position upon the sheet of material 10.

The first sheet of material 10 can be utilized alone or in combination with another sheet of material (not shown) to wrap a potted plant or flower pot. The term "flower pot" refers to any type of container used for holding a floral grouping or a potted plant. Examples of flower pots used in accordance with the present invention are clay pots, plastic pots, and the like. "Floral grouping" as used herein means cut fresh flowers, artificial flowers, a single flower other fresh and/or artificial plants or other floral materials and may include other secondary plants and/or ornamentation or artificial or natural materials which add to the aesthetics of the overall floral arrangement. The floral grouping comprises a bloom or foliage portion and a stem portion. However, it will be appreciated that the floral grouping may consist of only a single bloom or only foliage (not shown). The term "floral grouping" may be used interchangeably herein with the term "floral arrangement".

The sheet of material 10 may be constructed of a single layer of material or a plurality of layers of the same or different types of materials. Any thickness of the sheet of material 10 may be utilized in accordance with the present invention as long as the sheet of material 10 is wrappable about an object, such as a potted plant or flower pot, as described herein. The layers of material comprising the sheet of material 10 may be connected together or laminated or may be separate layers.

Referring now to FIG. 2C, another version of the invention is represented by the reference numeral 10a. Sheet 10a is comprised of a first sheet of material 36 and a second sheet of material 38.

The first sheet of material 36 has a first end 40 and a second end 42. The first sheet of material 36 also has a first side 44 and a second side 46. The sheet 36 has an upper surface 48 and a lower surface (not shown).

The second sheet of material 38 has a first end 50, a second end 52, a first side 54, a second side 56, an upper surface (not shown) and a lower surface 58.

The first sheet 36 may have the same spatial dimensions as the second sheet 38 in which the first end 40 and second end 42 would align with first end 50 and second end 52, respectively, and first side 44 and second side 46 would align with first side 54 and second side 56, respectively. Alternatively, the first sheet 36 and the second sheet 38 may have different spatial dimensions. In the latter case, portions of the first sheet 36 may overlap, or be overlapped by, portions of the second sheet.

The first sheet of material 36 has a thickness in a range from about 0.1 mils to about 30 mils and preferably the thickness of the first sheet of material is in a range from about 0.5 mils to about 10 mils. The first sheet of material 36 is constructed of a material which is flexible.

The second sheet of material 38 has a thickness in a range from about 0.1 mils to about 30 mils and preferably in a range from about 0.1 mils to about 10 mils. The second sheet of material 38 is flexible, but may be relatively more or less rigid compared to the first sheet of material 38.

The first sheet 36 and the second sheet of material 38 may be any shape and a square or rectangular shape is shown in FIG. 2C only by way of example. The second sheet of material for example only may be square, rectangular, circular or any other geometric shape.

The first sheet of material 36 or the second sheet of material 38 may be constructed of a single layer of materials or a plurality of layers of the same or different types of materials. Any thickness of the first sheet 36 or the second sheet of material 38 may be utilized in accordance with the present invention as long as the material is wrappable about an object such as a flower pot, as described herein, and as long as the material provides the rigidity, flexibility or the absorbency when desired. The layers of material comprising the first sheet of material 36 or the second sheet of material 38 may be connected together or laminated or may be separate layers.

Secured to the first sheet of material 36 is an elastic or elasticized fastener 2. The fastener 2 is secured to the first sheet 36 through a plurality of slits 60 cut into the first sheet 36. The fastener 2 is movable within the confines of the plurality of slits 60.

The lower surface of the first sheet 36 is at least partially connected to the adjacent upper surface of the second sheet 38. The connection may be by lamination or by way of bonding materials such as adhesives or cohesives applied to the lower surface of the first sheet 36, the upper surface of the second sheet 38, or both. The only condition is that the fastener 2 be freely expandable within the slits 60 of the first sheet 36. The bonding material may be disposed on the lower surface of the first sheet 36 or on the upper surface of the second sheet 38 or both, as strips, spots or other shapes, or the first sheet 36 and the second sheet 38 may be laminated to each other.

The first sheet of material 36 or the second sheet of material 38 as contemplated in FIG. 2C may be constructed of a single layer of material or a plurality of layers of the same or different types of materials. Any thickness of the sheet of material 36 or 38 may be utilized in accordance with the present invention as long as the sheet of material 36 or 38 may be wrapped or formed about at least a portion of a flower pot, as described herein. Additionally, an insulating material such as bubble film, preferable as one of two or more layers, can be utilized in order to provide additional protection for the item wrapped therein.

In a preferred embodiment, the first sheet of material 36 is constructed from two polypropylene films (a 20"×15" sheet of Mobil 270 ABW white opaque film laminated to a 20"×15" sheet of Mobil 220 AB clear film) having a thickness in a range of from less than about 1.0 mil to about 2.5 mils. The layers of material comprising the first sheet of material 36 may be connected together or laminated or may be separate layers.

The sheet of material 36 or 38 is constructed from any suitable wrapping material that is capable of being wrapped about a flower pot or potted plant, as the case may be. Preferably, the wrapping material 36 comprises paper (untreated or treated in any manner), cellophane, foil, polymer film, fabric (woven or nonwoven or synthetic or natural), burlap, or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The sheet of material may vary in color. Further, the sheet of material may consist of designs or decorative patterns which are printed, etched, and/or embossed thereon using inks or other printing materials. An example of an ink which may be applied to the surface of the sheet of material is described in U.S. Pat. No. 5,147,706 entitled "Water Based Ink On Foil And/Or synthetic organic polymer" issued to Kingman on Sep. 15, 1992 and which is hereby incorporated herein by reference. In addition, the sheet of material may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surfaces of the sheet of material. Moreover, each surface of the sheet of material may vary in the combination of such characteristics. The sheet of material itself may be opaque, translucent or partially clear or tinted transparent.

Referring now to FIGS. 3A–B, another version of the invention is represented by the reference numeral 10b. Sheet 10b is comprised of a first sheet of material 66 and a second sheet of material 68.

The first sheet of material 66 has a first end 70 and a second end 72. The first sheet of material 66 also has a first side 74 and a second side 76. The sheet 66 has an upper surface 78 and a lower surface (not visible).

The second sheet of material 68 has a first end 80, a second end 82, a first side 84, a second side 86, an upper surface (not shown) and a lower surface 88.

The first sheet 66 may have the same spatial dimensions as the second sheet 68 in which the first end 70 and second end 72 would align with first end 80 and second end 82, respectively, and first side 74 and second side 76 would align with first side 84 and second side 86, respectively. Alternatively, the first sheet 66 and the second sheet 68 may have different spatial dimensions. In the latter case, portions of the first sheet 66 may overlap, or be overlapped by, portions of the second sheet 68.

The first sheet of material 66 has a thickness in a range from about 0.5 mils to about 30 mils and preferably the thickness of the first sheet of material is in a range from about 0.5 mils to about 10 mils. The first sheet of material 66 is constructed of a material which is flexible.

The second sheet of material 68 has a thickness in a range from about 0.1 mils to about 30 mils and preferably in a range from about 0.1 mils to about 10 mils. The second sheet of material 68 is flexible, but may be relatively more or less rigid compared to the first sheet of material 68.

The first sheet 66 and the second sheet of material 68 may be any shape and a square or rectangular shape is shown in FIG. 3 only by way of example. The second sheet of material for example only may be square, rectangular, circular or any other geometric shape.

The first sheet of material 66 or the second sheet of material 68 may be constructed of a single layer of materials or a plurality of layers of the same or different types of materials. Any thickness of the first sheet 66 or the second sheet of material 68 may be utilized in accordance with the present invention as long as the material is wrappable about an object such as a flower pot, as described herein, and as long as the material provides the rigidity, flexibility or the absorbency when desired. The layers of material comprising the first sheet of material 66 or the second sheet of material 68 may be connected together or laminated or may be separate layers.

A fastener 2 is disposed in a space 88 between the first sheet 66 and the second sheet 68 which is formed when the first sheet 66 is connected to the second sheet 68 by applying the lower surface of the first sheet 66 to the upper surface of the second sheet 68 wherein at least portions of the lower surface of the first sheet 66 and portions of the upper surface of the second sheet 68 are left unconnected, these unconnected portions enclosing the space 88.

As explained above the connecting of the first sheet 66 to the second sheet 68 can be accomplished in a variety of ways including lamination, adhesion, or cohesion. The lower surface of the first sheet 66 may have a bonding material disposed thereon for connection to the upper surface of the second sheet 68, or the upper surface of the second sheet 68 may have a bonding material disposed thereon for connecting to the lower surface of the first sheet 66, or both the lower surface of the first sheet 66 and the upper surface of the second sheet 68 may have bonding materials disposed thereon for connecting the first sheet 66 and the second sheet 68 together. The space 88 has a width 90. The width 90 is of sufficient dimension to allow the fastener to expand in a direction 92 within the space 88. In the version of the invention in FIGS. 3A–B substantially the entire lower surface of the first sheet 66 is connected to the upper surface of the second sheet 68 except for the portions comprising the space 88.

The lower surface of the first sheet 66 is at least partially connected to the adjacent upper surface of the second sheet 68. The connection may be by lamination or through bonding materials such as adhesives or cohesives applied to the lower surface of the first sheet 66, the upper surface of the second sheet 68, or both. The only condition is that the fastener 2 be freely expandable within the unsealed gap between the first sheet 66 and the second sheet 68. The bonding material may be disposed on the lower surface of the first sheet 66 or on the upper surface of the second sheet 68 or both, as strips, spots or other shapes, or the first sheet 66 and the second sheet 68 may be laminated to each other.

Exactly as described above for the embodiments of FIGS. 2A and 2C, the first sheet of material 66 or the second sheet of material 68 as contemplated in FIGS. 3A–B may be constructed of a single layer of material or a plurality of layers of the same or different types of materials. Any thickness of the sheet of material 66 or 68 may be utilized in accordance with the present invention as long as the sheet of material 66 or 68 may be wrapped or formed about at least a portion of a portion of a flower pot, as described herein. Additionally, an insulating material such as bubble film, preferable as one of two or more layers, can be utilized in order to provide additional protection for the item wrapped therein.

In a preferred embodiment, the first sheet of material 66 may be constructed from two polypropylene films (a 20"×15" sheet of Mobil 270 ABW white opaque film laminated to a 20"×15" sheet of Mobil 220 AB clear film) having a thickness in a range of from less than about 1.0 mil to about 2.5 mils. The layers of material comprising the first sheet of material 66 may be connected together or laminated or may be separate layers.

The sheet of material 66 may be constructed from any suitable wrapping material that is capable of being wrapped about a flower pot or potted plant, as the case may be. Preferably, the wrapping material 66 comprises paper (untreated or treated in any manner), cellophane, foil, polymer film, fabric (woven or nonwoven or synthetic or natural), burlap, or combinations thereof.

FIG. 4 shows a version of the present invention referred to by the reference numeral 10c in which only portions of the upper surface of a first sheet 96 are connected to the lower surface of a second sheet 98. In this version, the sheet 10c is exactly the same as sheet 10b except the connection between the lower surface 100 of the first sheet 96 and the upper surface 102 of the second sheet 98 occurs in a first ring 104 and a second ring 106 which is concentric about the outer perimeter of the first ring 104. The remainder of the first sheet 96 is unconnected to the second sheet 98. In the intervening space 88 between the first ring 104 and the second ring 106 is disposed a fastener 2. It will be understood by one knowledgeable in the art that sheets 10b and 10c represent only two of many versions of the present invention in which a fastener is disposed in a space between two sheets connected to one another.

Referring now to FIG. 5, another version of a sheet of material is designated by the reference numeral 10d. Sheet 10d is a sheet of material 110 having a first end 112, a second end 114, a first side 116 and a second side 118. The sheet 10d has an upper surface 120 and a lower surface 122. A fastener 124 is releasably attached to the lower surface 122 of the sheet 10d. Fastener 124 is a fastener as described earlier. The fastener 124 can be releasably attached to the lower surface 122 of the sheet 110 using any suitable bonding material.

FIG. 6 shows another version of the present invention referred to by the reference numeral 10e which is exactly like the version 10c in FIG. 4 in which only portions of the upper surface of a first sheet 136 are connected to the lower surface of a second sheet 138 except in this version, there are two fasteners instead of one. The connection between the lower surface of the first sheet 136 and the upper surface of the second sheet 138 occurs in a first ring 144, and a second ring 146, which is concentric about the outer perimeter of the first ring 144 and a third ring 148 which is concentric about the outer perimeter of the second ring 146. The remainder of the first sheet 136 is unconnected to the second sheet 138. In a first intervening space 150 between the first ring 144 and the second ring 146 is disposed a first fastener 152. It will be understood by one knowledgeable in the art that sheets 10b, 10c and 10e represent only three of many versions of the present invention in which one or more fasteners are disposed in one or more spaces between two sheets connected to one another.

Similarly, in a second intervening space 154 between the second ring 146 and the third ring 148 is disposed a second fastener 156. Sheet 10e in use would thus be secured to the external surface of a potted plant or flower pot by two fasteners rather than one as will be described in further detail below.

Embodiments of FIGS. 7A–11D

Referring now to FIGS. 7A–D, a method for applying a sheet of material such as the sheet shown in FIG. 5 for covering a potted plant or pot is shown. The self-banding sheet 10d is shown laying flat upon the upper surface 160 of a cover forming apparatus 161, such as the cover forming apparatus of U.S. Pat. No. 4,733,521 entitled "Cover Forming Apparatus" issued to Weder et al., on Mar. 29, 1988 and which is hereby incorporated herein by reference.

The cover forming apparatus 161 comprises an opening 162. The opening has a cover former 164 mounted about a portion thereof. Also included in the opening 166 is a guide assembly 166 which has an upper restraining end 168.

In operation an article such as a pot 170 which may have a plant disposed therein (not shown) is disposed over the sheet 110 as shown in FIG. 7A. The pot 170 is pushed in a direction 172 into the opening 162. As the pot 170 is pushed downward, the lower surface 122 of the sheet 110 engages the cover former 164 as described in more detail in U.S. Pat. No. 4,733,521 referred to above. The upper surface 120 of the sheet 110 is appressed against the outer surface 174 of the pot 170. As the pot 170 continues its downward motion the fastener 124 engages the upper restraining end 168 of the guide assembly 166 which arrests the downward motion of the fastener 124 (FIG. 7B). Once the pot 170 and the sheet 110 held there against are fully disposed into the opening 162, the fastener 124 presses the sheet 110 against the outer surface 174 of the pot 170 and thereby secures the sheet 110 to the pot 170 (FIG. 7C) The potted plant, the sheet 110 secured by the fastener 124 can then be removed from the cover forming apparatus 161 (FIG. 7D) yielding a covered potted plant 176.

Referring now to FIGS. 8A–D, another version of the present invention is shown. FIG. 8A shows a pot 170, a cover forming apparatus 161 and a sheet 110 with a fastener 124 secured thereto exactly the same as in FIGS. 7A–D except that an additional sheet of material 180 is disposed upon the sheet 110 and underneath the lower end of the pot 170. The sheet 180 may be fully connected, partially connected, or completely unconnected from the upper surface 120 of the sheet 110. As shown in FIGS. 8A–D, the covered potted plant 176a comprises two sheets, 110 and 180 appressed to the outer surface 174 of the pot 170 which are secured to the pot 170 with at least one fastener 124 as shown in FIG. 8D.

Referring now to FIGS. 9A–D, another version of the present invention is shown. FIG. 9A shows a pot 170, a cover forming apparatus 161 and a sheet of material 110a which is exactly the same as sheet 110, and which has a fastener 124 adhered to the lower surface 122a thereof, except that also disposed on the lower surface 122a of the sheet 110a is a ring of bonding material 182. When the pot 170 is disposed into the opening 162 as shown in FIGS. 9A–9D, the fastener 124 engages the guide assembly 166 wherein the fastener 124 is urged upward into a position wherein the fastener 124 engages the ring of bonding material 182. The ring 182 serves to bond the fastener 124 more firmly about the outer surface 174 of the pot 170 such that the fastener 124 is less prone to be displaced from its sheet holding position.

Referring now to FIGS. 10A–D is shown a method of using the sheet 10b shown in FIGS. 3A–B. FIG. 10A shows a pot 170, a cover forming apparatus 161 and a first sheet of material 66 and a second sheet of material 68 connected to the first sheet 66 and which has a fastener 2 disposed in a space 88 therebetween. The sheet 10b is disposed over the opening 162 in the cover forming apparatus 161. When the pot 170 is disposed into the opening 162 as shown in FIGS. 10B–C, the fastener 2 engages the guide assembly 166 wherein the fastener 2 is urged upward within the space 88 into a position wherein the fastener 2 engages the outer surface 174 of the pot 170. The fastener 2 thereby serves to connect the sheet 10b firmly about the outer surface 174 of the pot 170.

Referring now to FIGS. 11A–D is shown a method of using the sheet 10d exactly as shown in FIGS. 7A–D except FIG. 11A shows a pot 170a having a fastener support device 184 disposed about the outer surface 174a of the pot 170a. When the pot 170a is disposed into the opening 162 in direction 172 as shown in FIGS. 11A–11D, the fastener 124 engages the guide assembly 166 wherein the fastener 124 is urged upward into a position wherein the fastener 124 is rolled over the fastener support device 184. The fastener support device 184 serves to connect the fastener 124 more firmly about the outer surface 174a of the pot 170a such that the fastener 124 is less prone to be displaced from its sheet holding position.

Figure 13:
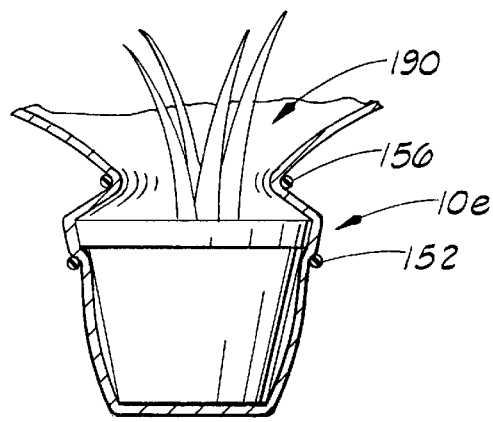
FIG. 13 is a side-sectional view of a pot cover constructed in accordance with the present invention having a first fastener positioned above the upper rim of the pot and a second fastener positioned below the upper rim of the pot.
Figure 14:
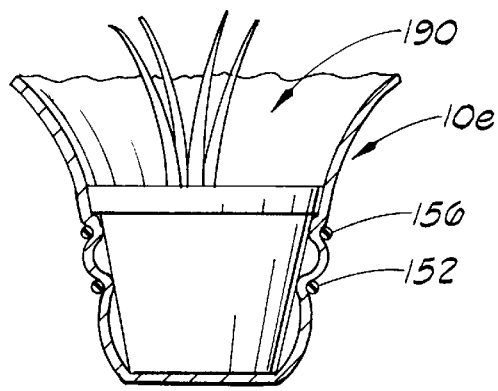
FIG. 14 is a side-sectional view of a pot cover constructed in accordance with the present invention having two fasteners, each positioned below the upper rim of the pot.

Embodiments of FIGS. 12–14

Referring now to FIG. 12, a potted plant is generally designated by the reference numeral 190. A sheet of material exactly the same as the sheet 10d is shown wrapped about the potted plant 190. In this version however, the fastener 124 is disposed above the upper end of the potted plant 190 such that the fastener 124 gathers the sheet about the lower end of the botanical items comprising the potted plant 190. The sheet is held firmly about the outer surface of the potted plant 190 by virtue of the fact that the fastener 124 is secure above the rim of the potted plant 190.

FIG. 13 shows a potted plant 190 which is exactly the same as the potted plant 190 in FIG. 12 except that the sheet 10e (FIG. 6) is formed about the outer surface of the potted plant 190. Sheet 10e has a first fastener 152 and a second fastener 156 fastening the sheet 10e about the potted plant 190. Fastener 156 is disposed above the upper rim of the potted plant 190 and fastener 152 is disposed below the upper rim of the potted plant 190. In this way the sheet 10e is secured in two locations about the potted plant 190, thereby enhancing the connectedness of the cover 10e to the potted plant 190.

Shown in FIG. 14 is a potted plant 190 exactly the same as these shown in FIG. 13 except the potted plant 190 is covered by a sheet 10e having a first fastener 152 and a second fastener 156 which are connected at a position below the upper rim of the potted plant 190.

Figure 15A:
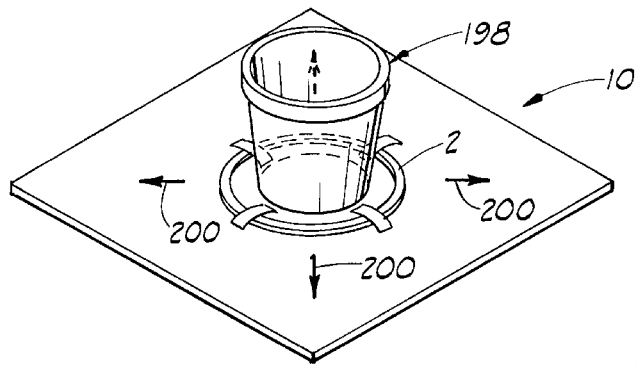
FIG. 15A is a perspective view of a sheet of material similar to the sheet of FIG. 1 and having a pot disposed thereupon.
Figure 15B:
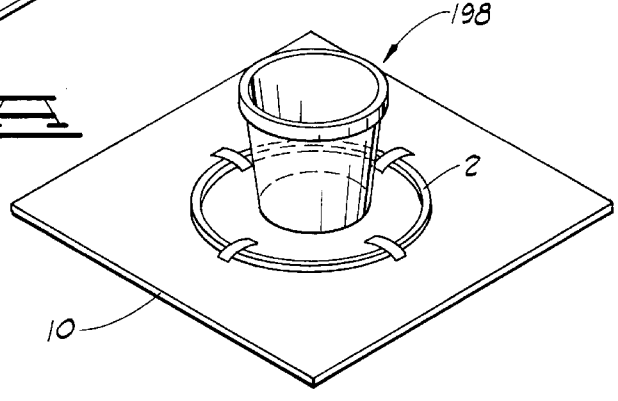
FIG. 15B is the sheet of FIG. 15A in which the fastener has been outwardly stretched to accommodate the pot.
Figure 15C:
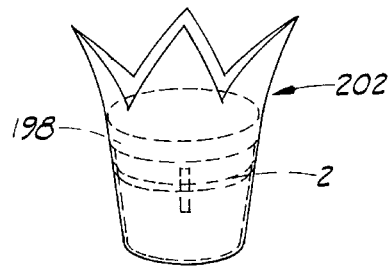
FIG. 15C is the sheet and pot of FIGS. 15A–B after the sheet has been drawn and fastened about the pot.

Embodiments of FIGS. 15A–C

FIG. 15A shows a sheet of material 10 as described in FIG. 1 and having a pot 198 disposed thereon (FIGS. 15A–15C). In this version of the method of used of sheet 10, the fastener 2 is manually pulled outwardly in directions 200a–200d until the fastener 2 has been sufficiently drawn. The fastener 2 is then manually raised up about the outer surface of the pot 198 then is allowed to retract against the outer surface of the pot 198 drawing the sheet 10 about the pot 198 to form a cover 202 about the pot 198. In this version of the invention, the fastener is between the sheet 10 and the outer surface of the pot 198.

Figure 16A:
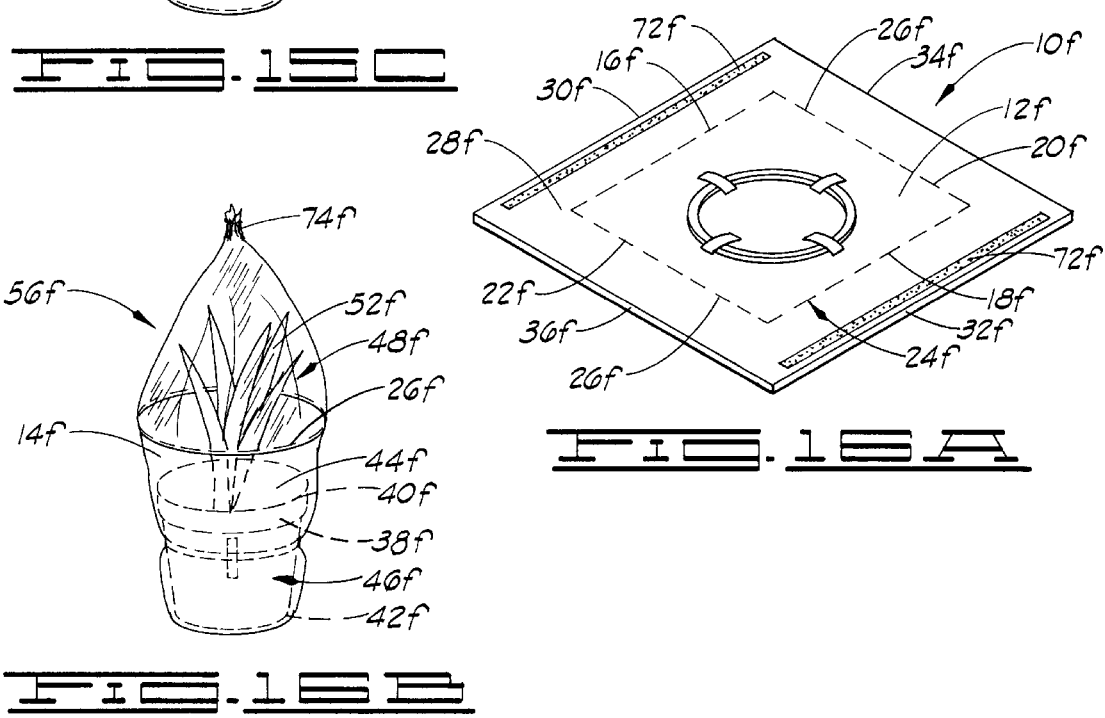
FIG. 16A is a perspective view of a sheet similar to the sheet of FIG. 1 except a sheet extension is attached to the sheet.
Figure 16B:
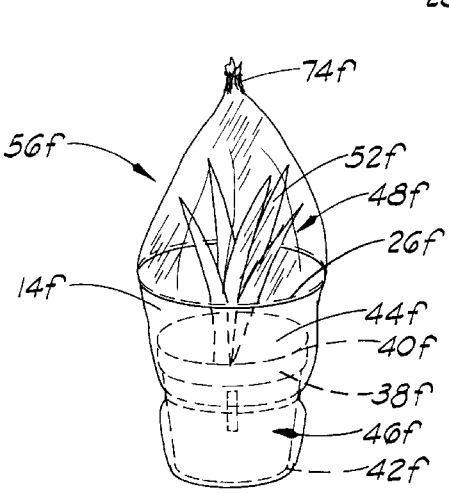
FIG. 16B is a perspective view of the sheet of 16A after it has been drawn and fastened about a potted plant.

Embodiments of FIGS. 16A–B

Referring to FIG. 16, as shown therein and designated by the general reference numeral 10f is another sheet of material constructed in accordance with the present invention. The sheet of material 10f shown in FIG. 16A has an upper surface 12f, a lower surface 14f (FIG. 16B), a first end 16f, a second end 18f, a first side 20f and a second side 22f. The ends 16f and 18f cooperate with the sides 20f and 22f to define an outer peripheral surface 24f of the sheet of material 10f. The outer peripheral surface 24f of the sheet of material 10f is defined by perforations 26f, as shown in FIGS. 16A–B.

As shown in FIGS. 16A–B, a sheet extension 28f is connected to the outer peripheral surface 24f of the sheet of material 10f. As shown in FIG. 16A, the sheet extension 28f extends a distance outwardly from the outer peripheral surface 24f of the sheet of material 10f. The sheet extension 28f has a first end 30f a second end 32f, a first side 34f and a second side 36f. A portion of the sheet extension 28f extends a distance outwardly from the first end 16f of the sheet of material 10f terminating with the first end 30f of the sheet extension 28f. Another portion of the sheet extension 28f extends a distance outwardly from the second end 18f of the sheet of material 10f terminating with the second end 32f of the sheet extension 28f. Yet another portion of the sheet extension 28f extends a distance outwardly from the first side 20f of the sheet of material 10f terminating with the first side 34f of the sheet extension 28f. Still another portion of the sheet extension 28f extends a distance outwardly from the second side 22f of the sheet of material 10f terminating with the second side 36f of the sheet extension 28f.

The sheet extension 28f cooperates with the sheet of material 10f to define a generally square or rectangularly shaped sheet with the perforations 26f being disposed in a central portion of the sheet and defining the outer peripheral surface 24f of the sheet of material 10f. Preferably, the sheet of material 10f and the sheet extension 28f are unitary and formed from a single sheet or plies or multiple sheets one on top of the other which may or may not be laminated.

The sheet of material 10f and the sheet extension 28f are constructed from any suitable flexible material that is capable of being wrapped about a floral grouping and formed into the covering, as described herein. Preferably, the sheet of material 10f and the sheet extension 28f are constructed of a material selected from a group of materials consisting of paper, metal foil, cloth (natural or synthetic), denim, burlap or polymer film as defined above or combinations thereof.

The sheet of material 10f and the sheet extension 28f have a thickness in a range from about 0.1 mils to about 30 mils. Preferably, the sheet of material 10f and the sheet extension 28f have a thickness in a range from about 0.1 mils to about 5 mils.

The sheet of material 10f and the sheet extension 28f may be any shape and a rectangular shape is shown in FIG. 16A only by way of example. The sheet of material 10f and the sheet extension 28f for example only may be square, rectangular, circular or any other geometric shape such as heart shaped.

The sheet of material 10f and the sheet extension 28f may be constructed of a single layer of material or a plurality of layers of the same or different types of materials. Any thickness of the sheet of material 10f and the sheet extension 28f may be utilized in accordance with the present invention as long as the sheet of material 10f and the sheet extension 28f is wrappable about a flower pot and formable into the covering, as described herein. The layers of material comprising the sheet of material 10f and the sheet extension 28f may be connected together or laminated or may be separate layers.

The covering of the present invention is particularly constructed to be used with a pot 38f (FIG. 16B). The pot 38f has a top 40f, a bottom 42f with an opening through the top 40f forming a receiving space 44f within the pot 38f. The pot 38f also has an outer peripheral surface 46f. As shown in FIG. 16B, the pot 38f is generally frusto-conical or cylindrically shaped. However, the pot 38f may be any shaped as may be desired in a particular application.

A floral grouping or botanical item 48f is disposed at least partially within the receiving space of the pot 38f, as shown in FIG. 16B. The floral grouping 48f has a stemmed end (not shown) and a bloom end 52f. In one embodiment as shown in FIG. 16B, material such as soil (not shown) is disposed in the receiving space 44f and a portion of the stem end extends into the soil. The floral grouping or botanical item extends a distance upwardly from the top 40f of the pot 38f terminating with the bloom end 52f.

The sheet extension 28f is transparent, although a decorative pattern also may be applied to the sheet extension 28f.

To form a pot cover 56f about the pot 38f, a pot 38f is disposed upon the upper surface 12f of the sheet 10f. The sheet 10f is then manually fastened about the outer surface of the pot 38f exactly the same as described previously in the embodiment of FIGS. 15A–C.

The pot cover 56f substantially encompasses the entire outer peripheral surface 46f of the pot 38f including the bottom 42f. The pot cover 56f extends from the bottom 42f to the top 40f of the pot 38f. A skirt (not shown) may extend radially outwardly from the top 40f of the pot 38f.

After the sheet 10f has been placed about the pot 38f to form the pot cover 56f the skirt extension 28f is formed about the floral grouping 48f (if present) to a position wherein the sheet extension 28f covers and encompasses a substantial portion of the floral grouping 48f including the bloom end 52f of the floral grouping 48f.

The sheet extension 28f preferably includes a bonding material 72f (FIG. 16A) disposed on the upper surface of the sheet extension 28f and extending about at least a portion of the outer peripheral surface of the sheet extension 28f. After the sheet extension 28f has been formed about the floral grouping 48f, the ends of the sheet of material are bonded together to provide a closed end 74f. The term "bonding material" as used herein is as defined below.

The sheet extension 28f remains in a position extending about the floral grouping 48f until it is desired to remove the sheet extension 28f. The sheet extension 28f is removed from the pot cover 56f by tearing along the perforations 26f separating the sheet extension 28f from the pot cover 56f. The sheet extension 28f then is removed from the floral grouping 48f leaving the pot cover 56f providing a decorative cover for the pot 38f.

In addition to the perforations 26f, the sheet extension 28f also may include perforations extending between the perforations 26f and the outer peripheral surface of the sheet extension 28f to further assist in the removal of the sheet extension 28f when it is no longer desired to keep the sheet extension 28f extending about the floral grouping 48f.

Embodiments of FIGS. 17A–19B

Referring to FIGS. 17A–B, as shown therein and designated by the general reference numeral 204 is a preformed pot cover. The pot cover 204 has an opening 206 in the upper end 208. The cover 204 is self-supporting by virtue of overlapping folds which are bonded to each other, thereby forming a rigid structure. One method of forming such a preformed pot cover or plant cover 204 is shown in U.S. Pat. No. 4,773,182 entitled "Article Forming System" issued to Weder et al., on Sep. 27, 1988 which is hereby incorporated herein by reference. The pot cover 204 has an interior surface 210 and an outer peripheral surface 212 and a bottom 214. The pot cover 204 further has a fastener 216 such as described elsewhere herein which is bondingly secured to the interior surface 210 of the pot cover 204 in a circumferential orientation. The fastener 216 may be secured by any means described herein in reference to bonding materials. In operation the fastener 216 is manually or automatically pulled outwardly causing the pot cover 204 to expand and a pot (not shown) is then deposited into the opening 206 of the pot cover 204. The fastener 216 is then released and the fastener 216 is retracted against the outer surface of the pot and thereby causes the pot cover 204 to be drawn and held securingly against the outer surface of the pot.

FIGS. 18A–B shows another version of a preformed pot cover having a fastener secured to the interior surface thereof. In this version, a pot cover 204a has a fastener 216 secured to the interior 210a with a sleeve 220 which is secured circumferentially to a portion of the interior surface 210a of the pot cover 204a. The fastener 216 is held within the space 222 between the sleeve 220 and the adjacent interior surface of the pot cover as shown in FIGS. 18A–B. The pot cover 204a can then be utilized to cover a pot as described previously in the version of the invention shown in FIGS. 17A–B.

FIGS. 19A–B shows another version of a preformed pot cover having a fastener secured to the interior surface thereof. In this version, a pot cover 204b has a fastener 216 connected to the interior 210b of the pot cover 204b. The fastener 216 is held by a plurality of loops 224 which may be similar to the loops described in FIGS. 1A and 1B. The method of connecting the fastener 216 to the pot cover 204b may cause constriction of the pot cover 204b when the cover 204b does not contain a pot. When it is desired to use the pot cover 204b to cover a pot, a pot such as pot 226 is provided. The fastener 216 can then be stretched as described above and the pot 226 can be inserted into the opening of the pot cover 204b.

It will be understood by one skilled in the art that the preformed pot covers described herein could include more than one fastener.

The term "bonding material" when used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer which may be applied to the sheet of material and, in this instance, heat, sound waves, or vibrations, also must be applied to effect the sealing.

The term "bonding material" when used herein also means any type of material or thing which can be used to effect the bonding or connecting of the two adjacent portions of the material or sheet of material to effect the connection or bonding described herein. The term "bonding material" also includes ties, labels, bands, ribbons, strings, tape, staples or combinations thereof. Some of the bonding materials would secure the ends of the material while other bonding material may bind the circumference of the wrapper. Another way to secure the wrapping is to heat seal the ends of the material to another portion of the material. One way to do this is to contact the ends with an iron of sufficient heat to heat seal the material.

The term "bonding material" when used herein also means any heat or chemically shrinkable material, and static electrical or other electrical means, magnetic means, mechanical or barb-type fastening means or clamps, curl-type characteristics of the film or materials incorporated in the sheet of material which can cause the material to take on certain shapes, and any type of welding method which may weld portions of the sheet to itself or to the pot, or to both the sheet itself and the pot.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquets or floral groupings.

The term "propagule" when used herein means any structure capable of being propagated or acting as an agent of reproduction including seeds, shoots, stems, runners, tubers, plants, leaves, roots or spores.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "band" when used herein means any material which may be secured about an object such as a flower pot, such bands commonly being referred to as elastic bands, rubber bands or non-elastic bands and also includes any other type of material such as an elastic or non-elastic string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material to removably or substantially permanently form a crimped portion and secure the crimped portion formed in the sheet of material which may be secured about an object such as the flower pot. The band also may include a bow if desired in a particular application.

The sheet of material used herein may further comprise at least one scent (not shown). Examples of scents utilized herein include (but are not limited to) floral scents (flower blossoms, or any portion of a plant), food scents (chocolate, sugar, fruits), herb or spice scents (cinnamon), and the like. Additional examples of scents include flowers (such as roses, daisies, lilacs), plants (such as fruits, vegetables, grasses, trees), foods (for example, candies, cookies, cake), food condiments (such as honey, sugar, salt), herbs, spices, woods, roots, and the like, or any combination of the foregoing. Such scents are known in the art, and are commercially available.

The scent may be disposed upon the sheet of material 10 by spraying the scent thereupon, painting the scent thereupon, brushing the scent thereupon, lacquering the scent thereupon, immersing the sheet of material in a scent-containing liquid, exposing the sheet of material to scent-containing gas, or any combination thereof.

The scent may be contained within a lacquer, or other liquid, before it is disposed upon the sheet of material 10. The scent may also be contained within a dye, ink, and/or pigment (not shown). Such dyes, inks and pigments are known in the art, and are commercially available, and may be disposed upon or incorporated in the sheet of material 10 by any method described herein or known in the art.

Changes may be made in the construction and the operation of the various components, elements and assemblies described herein or in the steps or the sequence of steps of the methods described herein without departing from the spirit and scope of the invention as defined in the following claims.

What is claimed is:

1. A preformed cover for covering a flower pot, the preformed cover comprising:

a preformed sheet of material formed into a shape sized to receive a flower pot, the preformed sheet of material having a base having a closed lower end and an open upper end with an object opening extending therethrough for receiving the flower pot, and an interior surface extending from the opening to the closed lower end; and an elastic fastener connected circumferentially to the interior surface of the preformed sheet of material.

2. The preformed cover of claim 1 wherein the sheet of material further comprises a material selected from a group of materials consisting of paper, cellophane, metal foil, fabric, or polymer film or combinations thereof.

3. The preformed cover of claim 1 wherein the sheet of material is defined further as having a thickness up to about 30 mils.

4. The preformed cover of claim 3 wherein the sheet of material is further defined as having a thickness in the range of from about 0.5 mils to about 10 mils.

5. The preformed cover of claim 3 wherein the sheet of material is further defined as being constructed from two or more layers of film, each layer having a thickness up to about 2.5 mils.

6. The preformed cover of claim 1 wherein the fastener is connectingly held to the preformed sheet of material by a plurality of loops attached to the sheet of material.

7. The preformed cover of claim 1 wherein the fastener is connectingly held to the preformed sheet of material by a plurality of slits in the preformed sheet of material.

8. The preformed cover of claim 1 wherein the fastener is connectingly held to the preformed sheet of material by a bonding material.

9. The preformed cover of claim 1 wherein the fastener is disposed within a space existing between the interior surface of the sheet of material and a sleeve connected to the interior surface of the sheet of material.

10. The preformed cover of claim 1 wherein the preformed sheet of material further comprises an extension for providing a sleeve about a plant disposed within the flower pot after the preformed cover is applied about the flower pot.

11. A cover for a flower pot having an outer peripheral surface and an upper opening, the cover comprising:

a sheet of material having an upper surface and a lower surface, the sheet of material sufficiently sized to substantially surround and encompass at least a portion of the outer peripheral surface of the flower pot when formed thereabout; and an elastic fastener connected to the sheet of material such that the sheet of material is positionable in a substantially flattened condition, the elastic fastener expandable to an extent sufficient to enable the fastener to be disposed about the outer peripheral surface of the flower pot with the sheet of material formed about at least a portion of the outer peripheral surface of the flower pot, and the elastic fastener movable toward a relaxed condition wherein one of the elastic fastener and the sheet of material is engageable with the flower pot so as to hold the sheet of material about the outer peripheral surface of the flower pot.

12. The cover of claim 11 wherein the elastic fastener forms a continuous loop.

13. The cover of claim 11 wherein the fastener is connectingly held to the sheet of material by a plurality of loops attached to the sheet of material.

14. The cover of claim 11 wherein the fastener is connectingly held to the sheet of material by a plurality of slits in the sheet of material.

15. The cover of claim 11 wherein the fastener is disposed within a space existing between a first layer of the sheet of material and a second layer of the sheet of material.

16. A cover for a flower pot having an outer peripheral surface and an upper opening, the cover comprising:

a sheet of material having an upper surface and a lower surface, the sheet of material sufficiently sized to substantially surround and encompass at least a portion of the outer peripheral surface of the flower pot when formed thereabout; and an elastic fastener connected to the sheet of material such that the sheet of material is positionable in a substantially flattened condition with the elastic fastener in a relaxed condition, the elastic fastener expandable to an extent sufficient to enable the fastener to be disposed about the outer peripheral surface of the flower pot and engage the outer peripheral surface with the sheet of material formed about at least a portion of the outer peripheral surface of the flower pot, and the elastic fastener movable toward the relaxed condition wherein one of the elastic fastener and the sheet of material is engageable with the flower pot so as to hold the sheet of material about the outer peripheral surface of the flower pot.

17. The cover of claim 11 wherein the elastic fastener forms a continuous loop.

18. The cover of claim 16 wherein the fastener is connectingly held to the sheet of material by a plurality of loops attached to the sheet of material.

19. The cover of claim 16 wherein the fastener is connectingly held to the sheet of material by a plurality of slits in the sheet of material.

20. The cover of claim 16 wherein the fastener is disposed within a space existing between a first layer of the sheet of material and a second layer of the sheet of material.

* * * * *

UNITED STATES PATENT AND TRADEMARK OFFICE
CERTIFICATE OF CORRECTION

PATENT NO.    : 6,080,453
DATED         : June 27, 2000
INVENTOR(S)   : Donald E. Weder et al.

It is certified that error appears in the above-identified patent and that said Letters Patent is hereby corrected as shown below:

<u>Title page,</u>
Item [73], Assignee, after "Okla. City, Okla.;" delete remainder of paragraph.

<u>Drawings,</u>
FIG. 15A, change numbers "200" to numbers -- 200a --, 200b --, 200c -- and add number -- 200d --.

<u>Column 5,</u>
Lines 63 and 64, after number "0.1" change word "mils" to word -- mil --.

<u>Column 6,</u>
Line 26, after word "flower" and before word "other" add a -- , --.
Line 67, after number "0.1" change word "mils" to word -- mil --.

<u>Column 7,</u>
Line 2, after number "0.5" change word "mils" to word -- mil --.
Lines 5 and 6, after number "0.1" change word "mils" to word -- mil --.

<u>Column 8,</u>
Line 14, change words "synthetic organic polymer" to -- Synthetic Organic Polymer --.
Lines 50 and 52, after number "0.5" change word "mils" to word -- mil --.
Lines 55 and 56, after number "0.1" change word "mils" to word -- mil --.

<u>Column 11,</u>
Line 6, change number "166" to number -- 162 --.

<u>Column 12,</u>
Line 46, change word "used" to word -- use --.

<u>Column 13,</u>
Line 6, after number "30f" and before word "a" add a --, --.
Lines 38 and 40, after number "0.1" change word "mils" to word -- mil --.

UNITED STATES PATENT AND TRADEMARK OFFICE
CERTIFICATE OF CORRECTION

PATENT NO.    : 6,080,453
DATED         : June 27, 2000
INVENTOR(S)   : Donald E. Weder et al.

It is certified that error appears in the above-identified patent and that said Letters Patent is hereby corrected as shown below:

Column 17,
Line 26, after number "0.5" change word "mils" to word -- mil --.

Signed and Sealed this

Thirteenth Day of July, 2004

JON W. DUDAS
*Acting Director of the United States Patent and Trademark Office*